Jan. 15, 1963  O. WELLER  3,073,233
CAMERA WITH AUTOMATIC EXPOSURE AND DIAPHRAGM CONTROL
Filed March 25, 1960  5 Sheets-Sheet 1

INVENTOR
OTTO WELLER
BY Toulmin & Toulmin

ATTORNEYS

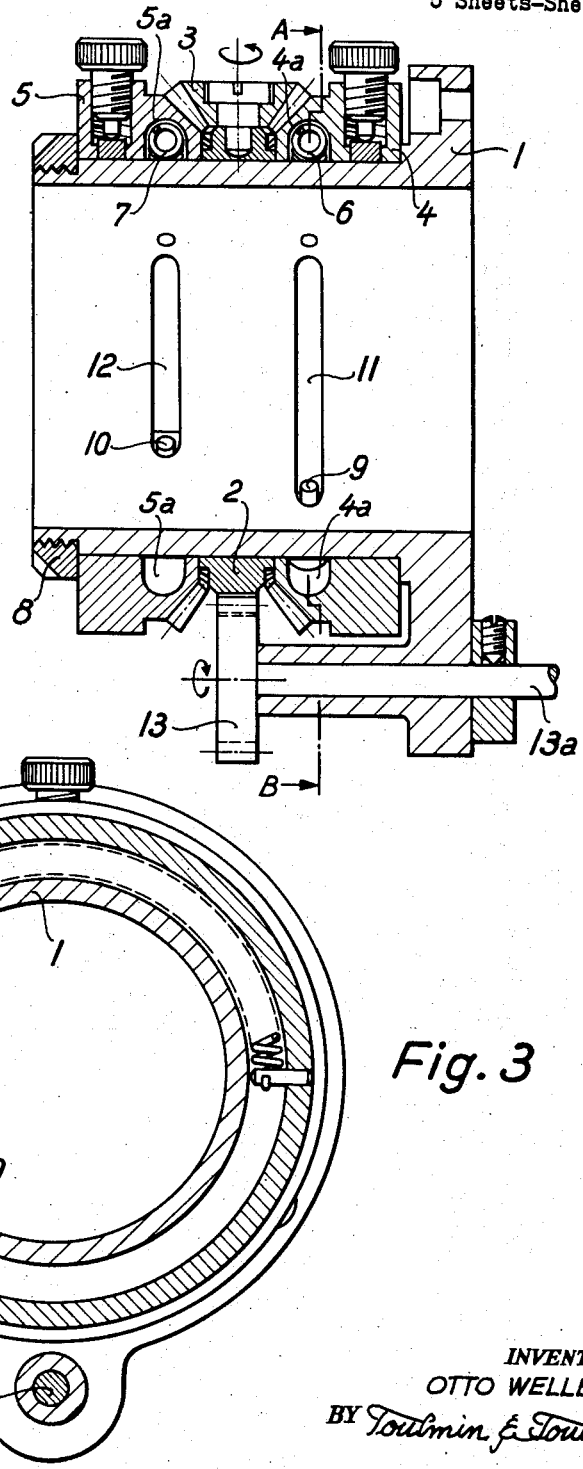

— · — exposure
——— diaphragm

Jan. 15, 1963     O. WELLER     3,073,233
CAMERA WITH AUTOMATIC EXPOSURE AND DIAPHRAGM CONTROL
Filed March 25, 1960     5 Sheets-Sheet 5

INVENTOR
OTTO WELLER
BY Toulmin & Toulmin

ATTORNEYS

United States Patent Office 3,073,233
Patented Jan. 15, 1963

3,073,233
CAMERA WITH AUTOMATIC EXPOSURE AND
DIAPHRAGM CONTROL
Otto Weller, Asslar, Germany, assignor to Ernst Leitz,
Gesellschaft mit beschrankter Haftung, Wetzlar (Lahn),
Germany
Filed Mar. 25, 1960, Ser. No. 17,598
Claims priority, application Germany Mar. 26, 1959
5 Claims. (Cl. 95—64)

The present invention relates to cameras, and more in particular the present invention relates to photographic or cinematographic cameras with automatic exposure and diaphragm control means.

It is known in the art to provide cameras with control means for controlling the exposure time and diaphragm and comprising differential gear means for distributing the exposure time and diaphragm values among the exposure time and diaphragm setting members. It is known to provide such cameras, wherein a control unit effects the adjustment of the exposure time and diaphragm setting members, from their respective end positions to the positions corresponding to a particular light value measured by the exposure meter. The control unit is required for adjusting the setting members according to a predetermined control program rather than uniformly, so as to achieve various, advantageous combinations of exposure time/diaphragm. By "advantageous combinations" it is desired to indicate the combinations of a comparatively short exposure time with a comparatively small opening width of the diaphragm.

The known constructions suffer from the disadvantage that one of the two members is arrested while the other one is being moved, so that at any particular moment only one of the two setting members for exposure time and diaphragm can be displaced.

This is highly undesirable since it would be of great advantage to be able to move one setting member into a particular position, and then move both setting members simultaneously, so that both reach their opposite end positions.

This object is achieved by the present invention which comprises control means acting upon the movement of the compensating member of the differential gear. Such means may comprise, for example, springs, weights, or also stop members, or various combinations of such elements, acting upon the exposure time and diaphragm setting members. These means are adapted to keep one setting member stationary while the other one is being moved, whereupon, at a predetermined moment, both setting members are displaced.

The invention will be more fully appreciated upon the following description of the accompanying drawings, wherein FIGURE 1 is a side elevational view of part of a camera with exposure and diaphragm control means of the type whereto the present invention applies;

FIGURE 2 is a sectional view of the objective mount of the camera of FIGURE 1;

FIGURE 3 is a cross-sectional view along lines A—B in FIGURE 2;

Figure 1:
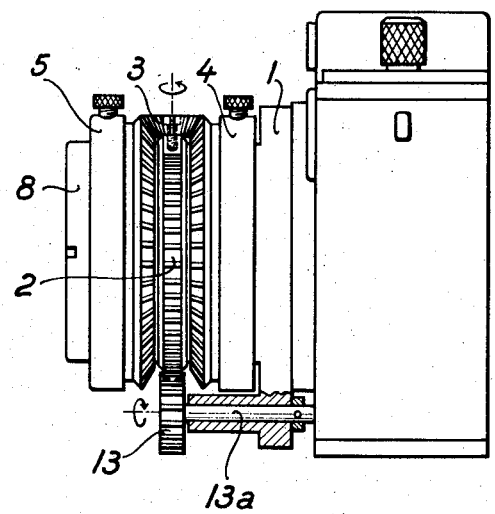

FIGURES 5a, 5b, 6a, 6b, 7a, 7b, 8, and 9a, 9b are schematic views and diagrams, respectively, illustrating various embodiments and modifications of the present invention.

Referring now to the drawings more in detail, and turning first to FIGURES 1 to 4, there is shown the objective mount 1 supporting a gear wheel 2, the latter bears on its periphery an intermediate bevel gear 3 meshing with gears 4 and 5 disposed at either large side of gear wheel 2. The gears 4 and 5 operate the exposure time and diaphragm setting members in a generally known manner, therefore not illustrated. The gears 4 and 5 have a recess, as at 4a and 5a, housing tension springs 6 and 7 (see FIGURE 2). The springs 6 and 7 are connected at one end, to the objective mount 1, the other end being connected with gears 4 and 5, respectively. The elements 2, 3, 4, 5, 6, and 7 are held on objective mount 1 by means of screw ring 8. Pins 9 and 10 are mounted on gears 4 and 5, respectively, and are adapted to slide in slots 11 and 12 of objective mount 1. Slots 11 and 12 thus limit the rotary movement of gears 4 and 5. Gear 2 is driven by motor 14 (or any other suitable power source) via shaft 13a and gear 13 (see FIGURE 4).

Figure 4:
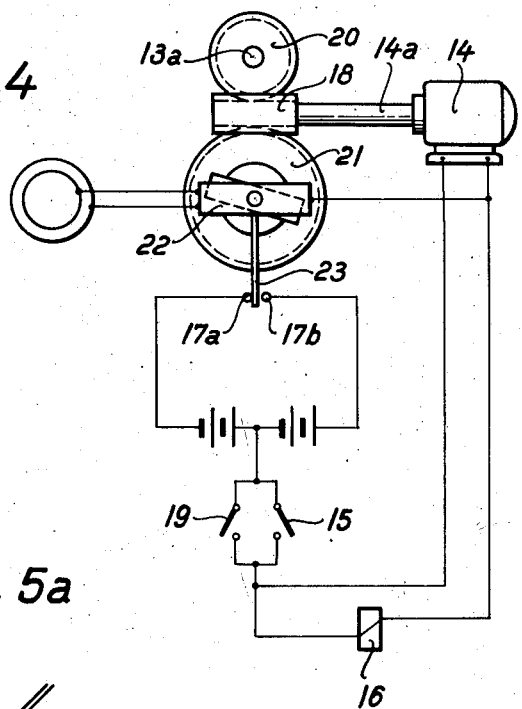
FIGURE 4 is a wiring diagram of the control circuit of an automatic camera whereto the present invention applies.

As illustrated in FIGURE 4, the camera is equipped with a light meter 22 fixedly connected with a gear 21 and having a pointer 23 whose free end travels between contacts 17a and 17b. The latter contacts are electrically connected with motor 14 via contacts 15 and 19, and a relay 16. Motor 14 is mechanically connected with gear 21 via driving shaft 14a and worm gear 18, it is also connected, again via shaft 14a and worm gear 18, with a gear 20 mounted on shaft 13a.

Figure 5A:
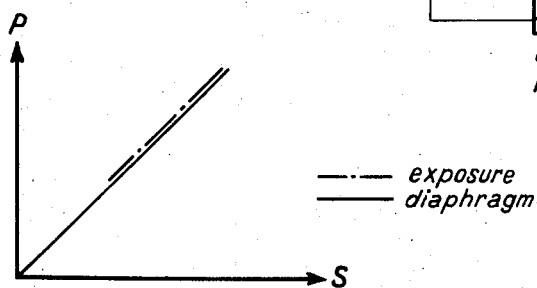
Figure 5B:
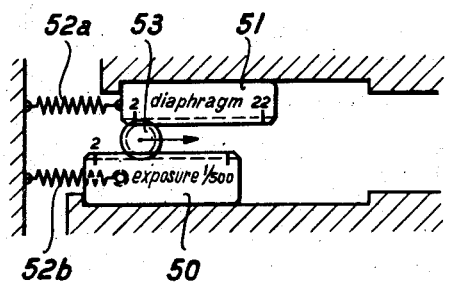

According to the invention, the free movement of the compensating member, e.g. an intermediate gear as designated with numeral 53 in FIGURE 5b (and corresponding to intermediate gear 3 in FIGURES 1 and 2), disposed between exposure control member 50 and diaphragm control member 51 (corresponding to gears 4 and 5 in FIGURES 1 to 3), is influenced by tension springs 52a and 52b connected at one end with a stationary portion of the camera, and with their other end with control members 50 and 51, respectively.

The operation is as follows:

After the camera has been aimed at the object whereof a picture is to be taken, contact 15 is closed and thereby motor 14 is started, provided the pointer 23 of meter 22 is in contact with either one of the contacts 17a and 17b. At the same time, relay 16 closes contact 19 and maintains it in closed position; a short impulse by contact 15 is thus sufficient for getting motor 14 started. Motor 14 drives gear 20 and thereby gears 13 and 2, the latter driving gears 4 and 5 via intermediate gear 2. Motor 14 also drives meter 22 via gear 21. The pointer 23 remains in contact with one of the two contacts 17a, 17b, until the movements of meter 22 and pointer 23 contribute to move pointer 23 out of contact, which comes to rest between contacts 17a and 17b. The circuit is thereby interrupted, motor 14 is put out of operation and relay 16 drops.

The free movement of the intermediate gear, e.g. intermediate gear 53 in FIGURE 5b, is influenced by the cooperation of tension springs 52a, 52b and exposure and diaphragm control members 50 and 51. The springs have a different pretension, but have the same characteristics, i.e. the same energy increase coefficient for every millimeter of expansion. As a consequence, the free movement of intermediate gear 53 is checked after exposure control member 50 has turned to a position wherein its spring 52b has reached a force identical to the pretension of spring 52a connected with diaphragm control member 51, the free movement also being checked during the further movement beyond the just mentioned position.

The functional correlation of the distance S travelled by the exposure and diaphragm control members and the increase of force P of the springs associated therewith, is illustrated in the diagram of FIGURE 5a.

Figure 6A:
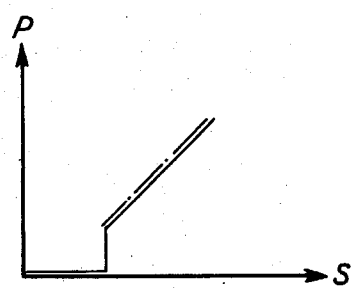
Figure 6B:
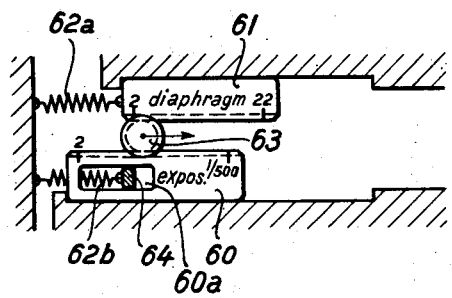

The above mentioned effect can also be accomplished by using two springs having identical characteristics; this is shown as a modification of the invention in FIGURES 6a and 6b of the drawings. Spring 62a is connected with the diaphragm control member 61, whereas spring 62b is connected with a slide member 64 disposed in recess 60a of exposure control member 60. Spring 62b is so disposed relative to exposure control member 60 that the latter can be moved by a predetermined distance without tensioning spring 62b. If the position has been reached from which both control members are to be moved, the exposure diaphragm combination having been obtained, exposure control member 60 moves spring 62b via slide member 64 in recess 60a. (See also FIGURE 6a.)

Figure 7A:
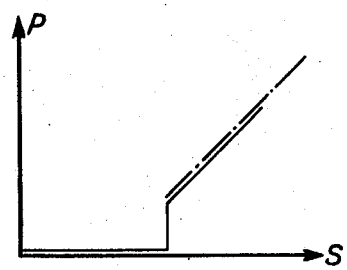
Figure 7B:
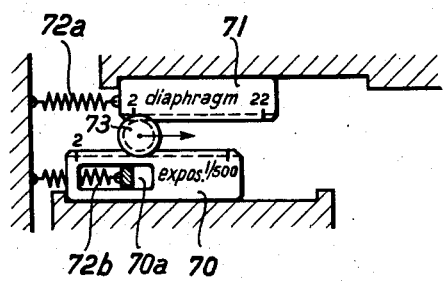

The embodiment illustrated in FIGURES 7a and 7b has the same spring arrangement as shown in FIGURES 6a and 6b with the following exception: Whereas exposure and diaphragm control members 60, 61 reach their respective end positions simultaneously, the exposure and diaphragm control members 70, 71 reach their respective end positions one after the other, as illustrated particularly in FIGURE 7a.

Figure 8:
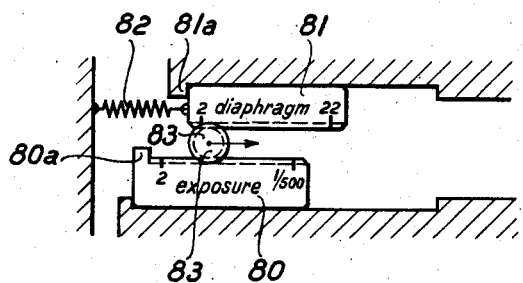

The free movement of the intermediate gear, e.g. intermediate gear 83 in FIGURE 8, can also be checked as illustrated in FIGURE 8, by mechanical blocking means. For example, the diaphragm control member may have an untoothed upwardly projecting portion 80a which is reached by intermediate gear 83 after a predetermined period of movement, at which time it is stopped. In this embodiment springs such as 62b, 72b can be dispensed with, and only a spring 82 is needed connected with the diaphragm control member 81.

As soon as intermediate gear 83 reaches the end of toothed portion 80a, gear 83 forms a rigid coupling between exposure and diaphragm control members 80, 81, both of which then move at the same speed. They also move uniformly on the return movement until diaphragm control member 81, which hitherto had been pulled back by spring 82, is stopped by detent 81a. Thereafter intermediate gear 83 runs freely on the toothed surfaces of the members 80 and 81 and returns exposure control member 80 to its initial position.

Figure 9A:
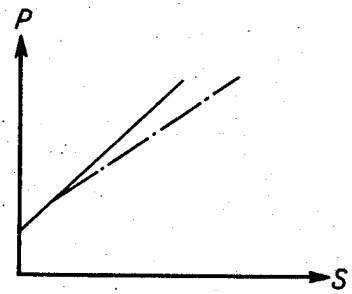
Figure 9B:
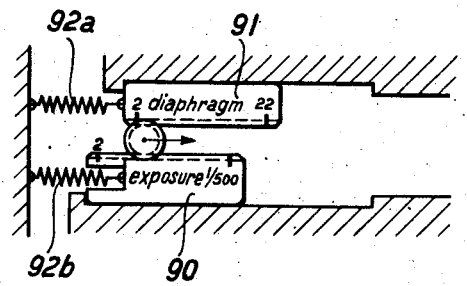

The movement of the intermediate gear can be retarded as illustrated in FIGURES 9a and 9b. The exposure and diaphragm control members 90, 91 are connected with a spring 92a, 92b, respectively, having different spring characteristics. As the two springs have different characteristics the exposure control member 90 moves with another speed than the diaphragm control member 91. It is also of advantage, to pretension spring 92a connected with diaphragm control member 91 so that for a determined period of time only exposure control member 90 is moved and only after such period both control members are moved. By using two springs of different characteristics, a good and useful combination of light is obtained, particularly in case of prevailing light conditions, (in the order of 11–13); at the same time, the exposure and diaphragm control members 90, 91 reach their respective end positions simultaneously.

It will be understood that this invention is susceptible to modification in order to adapt it to different usages and conditions and, accordingly, it is desired to comprehend such modifications within this invention as may fall within the scope of the appended claims.

What I claim is:

1. In a camera having exposure time value adjusting means and diaphragm value adjusting means, the combination comprising: differential gear means including a compensating member, for interconnecting the exposure time value and diaphragm value adjusting means; spring means connected with a first one of said adjusting means and applying a first force thereto; retarding means at said second adjusting means for applying an oppositely directed force to said first adjusting means via said compensating member, said oppositely directed force being smaller than said first force during a portion only of the travel path of said second adjusting means; and means operating said differential gear means to adjust said compensating member for imparting common adjustment upon said two adjusting means, whereby said compensating member moves said second adjusting means relative to said first adjusting means whenever the combined spring force and said oppositely directed force acts upon said first adjusting means in a direction opposite to the direction of adjustment during adjustment by said compensating member.

2. In a camera having exposure time value adjusting means and diaphragm value adjusting means, the combination comprising: differential gear means including a compensating member, for interconnecting the exposure time value and diaphragm value adjusting means; a first spring connected to a first one of said adjusting means; a second spring of similar characteristics but different pretension connected to the second one of said adjusting means; and means operating said differential gear means to move said compensating member against the tension of said springs, whereby said two adjusting means move relative to each other during a portion of their travel as long as said spring tensions are dissimilar, and they will be moved together during the remainder of their travel.

3. In a camera having exposure time value adjusting means and diaphragm value adjusting means, the combination comprising: differential gear means including a compensating member, for interconnecting the exposure time value and diaphragm value adjusting means; stop means for said two adjusting means; a first spring connected to a first one of said adjusting means; a second spring of similar characteristics connected to a slide member, said slide member being capable of positively engaging the second one of said adjusting means; and means operating said differential gear means to move said compensating member against the tension of at least one of said springs, whereby said second adjusting means is moved relative to said first adjusting means until said slide member positively engages said second adjusting means, said two adjusting means moving together against the tensions of said springs until at least one of said adjusting means is arrested by said stop means, and as long as said slide member engages said second adjusting means.

4. In a camera having exposure time value adjusting means and diaphragm value adjusting means, the combination comprising: differential gear means including a compensating member, for interconnecting the exposure time value and diaphragm value adjusting means; a first and second spring connected to a first and second one of said adjusting means, respectively and respectively applying a first and second retarding force thereto transmitted via said compensating member to the second and first one of said adjusting means, respectively; said springs having different characteristics; and means operating said differential gear means for moving said compensating member against the tension of said springs, whereby said two adjusting means move at a different rate due to a difference in retarding as produced by said two different springs.

5. In a camera having exposure time value adjusting means and diaphragm value adjusting means, the combination comprising: differential gear means including a compensating member, for interconnecting the exposure time value and diaphragm value adjusting means; a spring connected to a first one of said two adjusting means; blocking means on the second one of said two adjusting means restricting the range of movement of said compensating member relative to said second adjusting means; and means operating said differential gear means for moving said compensating member, whereby during a first portion of travel said compensating member moves said second adjusting means relative to said first adjusting means retarded by said spring, while during a second portion of travel said compensating member moves said two adjusting means together against the tension of said spring.

References Cited in the file of this patent

UNITED STATES PATENTS

| | | |
|---|---|---|
| 2,418,370 | Simmon | Apr. 1, 1947 |
| 2,913,969 | Faulhaber | Nov. 24, 1959 |

FOREIGN PATENTS

| | | |
|---|---|---|
| 822,377 | France | Sept. 20, 1937 |